United States Patent
Segaud et al.

(10) Patent No.: US 11,534,853 B2
(45) Date of Patent: Dec. 27, 2022

(54) PROCESS FOR MANUFACTURING A COMPOSITE CAST PART, AND COMPOSITE CAST PART

(71) Applicant: Bayerische Motoren Werke Aktiengesellschaft, Munich (DE)

(72) Inventors: Jean-Marc Segaud, Landshut (DE); Mario Senff, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 126 days.

(21) Appl. No.: 16/862,810

(22) Filed: Apr. 30, 2020

(65) Prior Publication Data
US 2020/0262002 A1    Aug. 20, 2020

Related U.S. Application Data

(63) Continuation of application No. PCT/EP2018/075842, filed on Sep. 25, 2018.

(30) Foreign Application Priority Data

Nov. 7, 2017  (DE) .................. 10 2017 219 704.8

(51) Int. Cl.
*B22D 19/00* (2006.01)
*B23K 20/12* (2006.01)
(Continued)

(52) U.S. Cl.
CPC ............ *B23K 20/122* (2013.01); *B22D 19/00* (2013.01); *B22D 19/16* (2013.01); *B23K 20/129* (2013.01);
(Continued)

(58) Field of Classification Search
CPC .... B22D 19/00; B22D 19/0081; B22D 19/02; B22D 19/04; B22D 19/16; B23K 11/08;
(Continued)

(56) References Cited

U.S. PATENT DOCUMENTS 7,971,887 B2 *  7/2011  Dorr ..................... B22D 19/16
                                                      280/124.109
2010/0007234 A1  1/2010  Alfermann et al.
(Continued)

FOREIGN PATENT DOCUMENTS

CN         103025467 A     4/2013
CN         103221673 A     7/2013
(Continued)

OTHER PUBLICATIONS

Colman, "Welding preheat practices: choose the right tool for your job," https://www.canadianmetalworking.com/canadianfabricatingandwelding/article/welding/welding-preheat-practices-choose-the-right-tool-for-your-job, Aug. 22, 2017 (Year: 2017).*

(Continued)

*Primary Examiner* — Kevin E Yoon
(74) *Attorney, Agent, or Firm* — Crowell & Moring LLP

(57) ABSTRACT

Process for manufacturing a part, in particular a composite cast part, includes the steps of: providing at least one insertion element; casting a casting material around at least a portion of the at least one insertion element such that at least one contact area is formed between the at least one insertion element and the casting material; and welding the at least one insertion element to the casting material in the contact area.

8 Claims, 1 Drawing Sheet

(51) Int. Cl.
*B22D 19/16* (2006.01)
*B23K 20/24* (2006.01)
*B23K 101/00* (2006.01)

(52) U.S. Cl.
CPC ........ *B23K 20/24* (2013.01); *B23K 2101/006* (2018.08)

(58) Field of Classification Search
CPC .... B23K 11/087; B23K 20/12; B23K 20/122; B23K 20/129
USPC ..................................... 228/2.1, 112.1–114.5
See application file for complete search history.

(56) References Cited

U.S. PATENT DOCUMENTS

| | | | |
|---|---|---|---|
| 2013/0009390 A1* | 1/2013 | Charest .................. | B62D 21/11 280/785 |
| 2013/0136946 A1* | 5/2013 | Liu ........................... | B22C 9/22 428/615 |
| 2013/0213218 A1 | 8/2013 | Kaiser et al. | |
| 2015/0056470 A1* | 2/2015 | Aoyama .............. | B60G 21/051 428/684 |

FOREIGN PATENT DOCUMENTS

| | | |
|---|---|---|
| CN | 104053515 A | 9/2014 |
| CN | 105251973 A | 1/2016 |
| DE | 10 2009 031 345 A1 | 4/2010 |
| DE | 10 2009 035 324 A1 | 2/2011 |
| DE | 10 2010 051 681 A1 | 5/2012 |
| DE | 10 2012 101 389 A1 | 8/2013 |
| JP | 2010-221222 A | 10/2010 |
| JP | 5400437 B2 | 1/2014 |

OTHER PUBLICATIONS

EPO machine translation of DE 102012101389 A1 (Year: 2013).*
Cui et al., "Resistance Spot Welding between Steel and Aluminum Alloy," 5th International Conference on Advanced Design and Manufacturing Engineering, Atlantis Press, pp. 777-781, Oct. 2015 (Year: 2015).*
International Search Report (PCT/ISA/210) issued in PCT Application No. PCT/EP2018/075842 dated Jan. 23, 2019 with English translation (six (6) pages).
German-language Written Opinion (PCT/ISA/237) issued in PCT Application No. PCT/EP2018/075842 dated Jan. 23, 2019 (six (6) pages).
German-language Search Report issued in German Application No. 10 2017 219 704.8 dated Jul. 3, 2018 with partial English translation (12 pages).
English translation of Chinese-language Office Action issued in Chinese Application No. 201880057216.8 dated Feb. 3, 2021 (seven (7) pages).

* cited by examiner

PROCESS FOR MANUFACTURING A COMPOSITE CAST PART, AND COMPOSITE CAST PART

CROSS REFERENCE TO RELATED APPLICATIONS

This application is a continuation of PCT International Application No. PCT/EP2018/075842, filed Sep. 25, 2018, which claims priority under 35 U.S.C. § 119 from German Patent Application No. 10 2017 219 704.8, filed Nov. 7, 2017, the entire disclosures of which are herein expressly incorporated by reference.

BACKGROUND AND SUMMARY OF THE INVENTION

The present invention relates to a method for producing a component, in particular a composite cast part, or a component connection, as well as to a composite cast part.

Composite cast parts of the type in question are known in principle from the prior art. For example, it is known to insert steel inserts in casting molds and to encapsulate said inserts with aluminum. In the case of composite casting, the connection mechanism can be attributed predominantly to a force-fitting connection which can, however, be supplemented for example by a material-bonding or form-fitting proportion depending on the procedure. By way of example, the insert elements may thus be correspondingly coated in order to generate a material bond by the incipient melting of the coating during the encapsulating. In practice, however, this often proves to be difficult, since different temperatures and/or flow velocities prevail in the casting mold depending on the position (close to the sprue, at a distance from the sprue, temperature-control concept, etc.). The result of this is that the coating of the insert elements is incipiently melted or melted-on to a different extent and a "secure" material bond is not created. Furthermore, problems can occur in the case of the heat treatment of composite cast parts owing to the different coefficients of thermal expansion of the materials used, as a result of which gaps can emerge between the different materials. In other words, although the fundamental approach of composite casting is known, in detail the known methods or components still entail many uncertainties and difficulties which make safe and efficient use more difficult, in particular in mass production as well.

It is therefore an object of the present invention to provide a method for producing a component, in particular a composite cast part, or a component connection, as well as a composite cast part, which make improved and more efficient components/products possible and are thus cost-effective.

This object is achieved by a method and by a composite cast part in accordance with the claimed invention.

According to the invention, a method for producing a component, in particular a composite cast part, comprises the following steps:
providing at least one insert element;
encapsulating at least certain regions of the at least one insert element with a cast material, wherein at least one contact region is formed between the at least one insert element and the cast material;
welding at least certain regions of the at least one insert element to the cast material in the contact region.

It is advantageous that, by virtue of the subsequent welding process, a high-quality, uniform and permanent material bond can be produced which makes it possible to fasten the insert element in the cast material in a secure, rigid and primarily permanent manner.

According to one preferred embodiment, the method further comprises the following step:
pressure welding, in particular friction stir welding, in the contact region.

Pressure welding refers to welding processes in which the parts to be welded are heated to the welding temperature required at the weld points and then pressed together by mechanical pressure. In this case, the heat required is supplied either by a flow of current through the weld point or by mechanical friction. In the case of friction stir welding, a rotating tool is used which has a pin and a shoulder oriented perpendicularly thereto. The shoulder has a larger diameter than the pin projecting therefrom and supplies the input of heat required, whereas the pin is provided to "agitate" the materials. Pressure welding is distinguished by a relatively low input of heat. Advantageously, moreover, filler materials are not required. In principle, however, this welding process or welding processes of this type involve(s) the problem that relatively complex clamping technology is necessary to securely lock in place the components or materials to be connected during the welding operation as well. It is advantageous that this problem is very effectively solved in the present case, since the two parts to be joined, specifically the insert element and the cast material, are already prepositioned and connected by the casting process such that bulky clamping technology for the welding process, in particular for friction stir welding, is not required. The friction stir welding process may expediently take place in a machining center or conventionally by way of a welding robot or with a fixed C-clamp. Further possible pressure welding processes that can be used are: forge welding, resistance welding, cold pressure welding, ultrasonic welding, explosion welding, electromagnetic pulse welding, diffusion welding, arc stud welding or MIAB welding (magnetically impelled arc butt welding). As an alternative or in addition, however, fusion welding processes may also be used.

A simple welded connection, even by means of friction stir welding, for example, would have significant disadvantages with respect to the achievable elongation at break over a (punch-)riveted connection/adhesive bond by way of the input of heat. In contrast, the inventive method makes it possible to produce rigid components with a high elongation at break, specifically in particular by virtue of the advantageous combination of a force fit and a form fit. For example, the method can be considered as an alternative to a riveted connection/adhesive bond, as is currently used in vehicle construction. The combination of two connection techniques is similar in this case: the adhesive bond corresponds e.g. to the encapsulating, whereas the riveted connection corresponds to the setting of, for example punctiform, weld points. It is advantageous, however, that component properties or connection properties optimized by the method are achieved, as will also be shown in more detail below.

According to one embodiment, in particular if at least certain regions of the insert element are completely encapsulated, the contact region has at least two, in particular opposite, contact surfaces or also two contact surfaces which are oriented parallel to one another, wherein the method comprises the following step:
welding the at least two contact surfaces to the cast material.

The welding may thus be performed on one side or on both sides. The setup and configuration of the welding operation, and where and in which form and/or position the welding is to be performed in the contact region, are advantageously effected in a manner appropriate for the loading.

The method preferably comprises the following step:
  forming a punctiform or linear weld seam, in particular a friction weld seam.

In principle, the contact region or the contact surfaces does/do not have to be welded over its/their entire surface area. The actual configuration is dependent in particular on the form and size of the insert element. According to one embodiment, the contact region per se is formed in a linear manner and analogously to a riveted connection/adhesive bond or to a conventional weld seam which is provided to connect two components. According to one embodiment, a contact region formed in this way is provided with a punctiform weld seam and/or with a linear weld seam, the latter as it were over the entire surface area. According to one embodiment, a width of the contact region corresponds (approximately) to a diameter of the above-mentioned shoulder of the friction stir welding tool.

The method particularly preferably comprises the following step:
  encapsulating in the die-casting operation.

It is advantageous that the insert element is provided with cutouts or holes. According to one preferred embodiment, a perforated steel sheet is inserted into a die-casting mold and encapsulated, for example with aluminum. This composite casting is then welded via the friction welding process. It is advantageous that the two parts to be joined are already prepositioned and connected by the composite casting, such that bulky clamping technology for the friction stir welding is not necessary. The form fit, which is produced through the perforated steel sheets in the composite casting, ensures a high elongation at break in comparison with pure friction stir welding. Consequently, a connection of this type is distinguished by a high energy absorption, which is required, in particular, in vehicle components which are subjected to load by a crash. The transmission of force between the aluminum casting and, for example, the steel insert is higher while maintaining the same flange width compared to the combination of punch-riveting and adhesive bonding processes.

The method further comprises the following step:
  performing a heat treatment before the welding.

Any gaps that form between the two materials, for example the aluminum cast material and the steel insert element material, and that occur only after or during the heat treatment process may expediently be closed again by virtue of the welding, in particular by virtue of the friction stir welding.

The invention further relates to a composite cast part comprising at least one insert element, wherein at least certain regions of the at least one insert element are encapsulated by a cast material, wherein the encapsulating forms at least one contact region between the at least one insert element and the cast material, and wherein the at least one insert element is connected to the cast material by welding in the contact region. In the case of composite casting, the connection mechanism can be attributed predominantly to a force-fitting connection. It is advantageous that, in the present case, by virtue of the welding process this force-fitting connection is supplemented by a targeted and defined material-bonding connection, as a result of which components, in particular composite cast parts, with the best mechanical properties can be produced.

The connection is particularly preferably produced by pressure welding, in particular friction stir welding. This utilizes the effect that the two parts to be joined are already prepositioned and connected by the composite casting such that bulky clamping technology for the friction stir welding is again not required.

According to one embodiment, the at least one insert element is welded over its entire surface area. As an alternative, even only certain regions of the insert element are welded. The actual configuration depends both on the function of the insert element and on the size and position thereof.

According to one embodiment, the insert element is formed as a reinforcing element, for example as a steel insert, which is embedded completely in an aluminum cast material. For targeted additional fastening in the surrounding cast material, the insert element is completely or at least partially welded, wherein punctiform and/or linear material-bonding connection regions or weld seams are formed.

As an alternative, the insert element is not intended merely for reinforcement but also to provide additional functions, such as the forming or constituting of possible fastening means.

According to one embodiment, the at least one insert element forms or constitutes at least one fastening flange, wherein the fastening flange protrudes out from the cast material. In other words, the insert element is at least not completely encapsulated. The contact region or regions is/are formed in particular in the peripheral region or regions of the later component. The fastening flange expediently comprises fastening openings, such as holes, by way of which the composite cast part can be connected to other components in a form-fitting and/or force-fitting and also material-bonding manner. In this way, steel flanges can advantageously be integrated into cast components made of aluminum and can be joined by type in vehicle body construction, since the connection points are present e.g. in the steel. The above-mentioned material combination is to be understood merely by way of example in this case.

According to one preferred embodiment, the cast material is an aluminum material, wherein the insert element is formed from a steel material. The insert element preferably has at least one recess or opening or one or more holes. The form fit, which is produced in particular through the perforated steel sheets in the composite casting, ensures a possible high elongation at break in comparison with pure friction stir welding.

According to one embodiment, the composite cast part is a chassis component or structural component of a motor vehicle. Typical usage situations are bodyshell components, such as pillars, longitudinal members or crossmembers, or else assembly parts, such as e.g. seat structures. The advantages and features mentioned in conjunction with the method apply analogously and correspondingly to the composite cast part, and vice versa.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
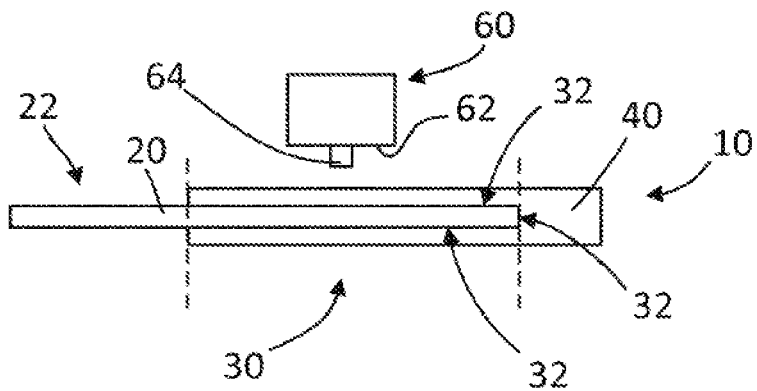
FIG. 1 is a schematic view of a composite cast part before the welding.

FIG. 1 shows a schematic view of a component 10, wherein the component 10 is formed from a cast material 40 in which an insert element 20 is embedded. This arrangement forms a contact region 30 which is outlined by the vertical dashed lines. The contact region 30 comprises a plurality of contact surfaces 32 on the circumference. The insert element 20 is formed or positioned in such a way that at least certain regions thereof protrude out of the cast material 40, as a result of which a fastening flange 22 is formed. A tool, in particular a friction stir welding tool, with the reference sign 60 is outlined and comprises a shoulder 62 as well as a pin 64. The positioning thereof during the welding operation is outlined in FIG. 2.

Figure 2:
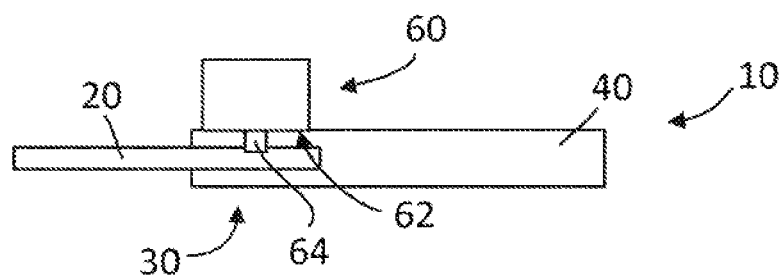
FIG. 2 is a further schematic view of a composite cast part during the welding.

FIG. 2 substantially shows the component 10 known from FIG. 1, wherein the dimensions of the insert element 20 are formed differently, however. In particular, here a contact region 30 is substantially as wide as a diameter of a shoulder 62 of the friction stir welding tool 60. It can be seen that a pin 64 at least grazes the insert element 20. The pin 64 penetrates the cast material 40 and scrapes against the surface of the insert element 20. Diffusion processes are initiated by the resulting input of heat, wherein, depending on the material pairing, one or both parts to be joined are plasticized such that they enter into a bond with one another. The low input of energy as well as the absence of a chemical pretreatment during the friction stir welding is particularly advantageous. Further, this welding process does not give rise to any smoke or gas. The weld seam is high-quality and moreover able to bear high loads, since the welding process remains below the melting point of the parts to be joined.

Figure 3:
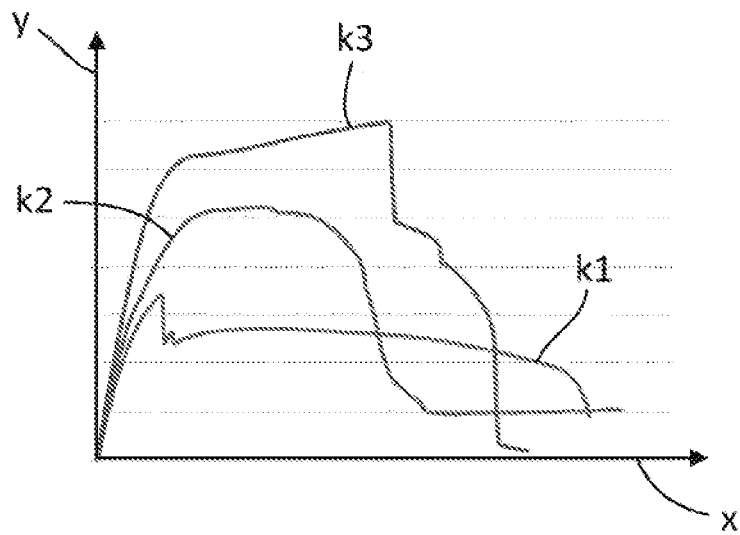
FIG. 3 is a force-displacement diagram for different connection techniques.

Finally, FIG. 3 shows a force-displacement diagram for different connection techniques with the three curves k1, k2 and k3. The displacement is plotted on the x axis and the force is plotted on the y axis. The curve k1 shows punch-riveting in combination with adhesive bonding, the curve k2 shows "pure" encapsulating and the curve k3 shows encapsulating in combination with friction stir welding. It can be seen that the combination of encapsulating and friction stir welding in the tensile test illustrated here makes it possible to produce connections/components with outstanding strengths. Moreover, the achievable values for the elongation at break are very high, in particular in comparison with pure welded connections (not shown here) as well.

LIST OF REFERENCE SIGNS

10 Component
20 Insert element
22 Fastening flange
30 Contact region
32 Contact surface
40 Cast material
60 Tool
62 Shoulder
64 Pin
k1 Punch-riveting and adhesive bonding
k2 Encapsulating
k3 Encapsulating and friction stir welding
x Displacement
y Force The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a component or a component connection, comprising:
   providing at least one insert element;
   encapsulating at least certain regions of the at least one insert element with a cast material, wherein at least one contact region is formed between the at least one insert element and the cast material; and
   welding at least certain regions of the at least one insert element to the cast material in the contact region away from a location at which the encapsulated portion of the at least one insert element ends and a not-encapsulated portion of the at least one insert element begins.

2. The method according to claim 1, wherein the act of welding comprises:
   pressure welding in the contact region.

3. The method according to claim 1, wherein the act of welding comprises:
   friction stir welding in the contact region.

4. The method according to claim 1, wherein the contact region has at least two contact surfaces, the method further comprising:
   welding the at least two contact surfaces to the cast material.

5. The method according to claim 4, wherein
   the at least two contact surfaces are opposite contact surfaces.

6. The method according to claim 1, further comprising:
   forming a punctiform and/or linear weld seam.

7. The method according to claim 1, wherein the act of encapsulating comprises:
   encapsulating in a die-casting operation.

8. The method according to claim 1, further comprising:
   performing a heat treatment before the welding.

* * * * *